(12) United States Patent
Helfrich et al.

(10) Patent No.: US 9,348,382 B2
(45) Date of Patent: May 24, 2016

(54) METHOD AND APPARATUS FOR PROVIDING POWER TO AN ELECTRONIC DEVICE

(71) Applicant: MAXIM INTERGRATED PRODUCTS, INC., San Jose, CA (US)

(72) Inventors: Kenneth J. Helfrich, Duluth, GA (US); Sang H. Kim, Grayslake, IL (US); Fabrizio Fraternali, Monza e Brianza (IT)

(73) Assignee: Maxim Integrated Products, Inc., San Jose, CA (US)

( * ) Notice: Subject to any disclaimer, the term of this patent is extended or adjusted under 35 U.S.C. 154(b) by 420 days.

(21) Appl. No.: 13/775,039

(22) Filed: Feb. 22, 2013

(65) Prior Publication Data

US 2014/0245030 A1 Aug. 28, 2014

(51) Int. Cl.
*G06F 1/26* (2006.01)
*H02M 7/04* (2006.01)

(52) U.S. Cl.
CPC .. *G06F 1/26* (2013.01); *H02M 7/04* (2013.01)

(58) Field of Classification Search
CPC ............ G06F 1/26; G06F 1/266; H02M 7/04; H02M 7/00; H02M 7/42; H02M 7/44
See application file for complete search history.

(56) References Cited

U.S. PATENT DOCUMENTS

| | | | |
|---|---|---|---|
| 8,661,281 B2 * | 2/2014 | Chang et al. | 713/324 |
| 8,760,123 B2 | 6/2014 | Hawawini et al. | |
| 2008/0272741 A1 * | 11/2008 | Kanamori | 320/137 |
| 2011/0016334 A1 * | 1/2011 | Tom | G06F 1/266 713/300 |
| 2012/0300516 A1 * | 11/2012 | Chen | H02M 3/33507 363/78 |
| 2013/0151749 A1 * | 6/2013 | Lai et al. | 710/313 |
| 2014/0136863 A1 * | 5/2014 | Fritchman | G06F 1/26 713/310 |
| 2014/0239886 A1 * | 8/2014 | Lalitnuntikul et al. | 320/107 |

OTHER PUBLICATIONS

Texas Instruments Product Manual, "I2C Controlled 4.5A Single Cell USB/Adapter Charger With Narrow VDC Power Path Management and USB OTG", Jan. 2012, Rev. Oct. 2012, pp. 46.

* cited by examiner

*Primary Examiner* — Fahmida Rahman
(74) *Attorney, Agent, or Firm* — TIPS Group

(57) ABSTRACT

In an embodiment, set forth by way of example and not limitation a USB power converter for an electronic device includes a USB bus including VBUS power line, a D− data line and a D+ data line, a variable voltage converter, a processor clock, a USB transceiver coupled to the D− data line and the D+ data line, and a processor coupled to processor clock and to the USB transceiver. Preferably, the variable voltage converter has an alternating current (AC) input, a direct current (DC) output coupled to the VBUS power line, and a voltage control input responsive to a voltage control signal to provide a plurality of voltage levels at the DC output. The process is, in this example embodiment, operative to develop the control signal based upon communication from an electronic device connected to the USB bus. In a non-limiting embodiment, the USB power converter further includes a host ID controller having a host ID control input coupled to the processor, the host ID controller selectively coupled to the D− data line and the D+ data line in response to a host ID control signal developed by the processor.

16 Claims, 4 Drawing Sheets

METHOD AND APPARATUS FOR PROVIDING POWER TO AN ELECTRONIC DEVICE

BACKGROUND

An increasing number of electronic devices are being powered through their USB connectors. For example, many smart phones, MP3 players, tablet computers, etc. may have batteries that can only be charged through their USB connectors. At the USB standard voltage of 5 volts DC, the current available for charging typically ranges from about 500 mA to about 1.5 A. As a result, there is typically a maximum of about 7.5 W available for charging through a USB connector of an electronic device.

The larger the battery of an electronic device the longer it takes to charge. With a maximum available power of 7.5 W, some electronic devices, such as tablet computers, can take many hours to charge. Electronic devices with even larger batteries, such as laptop computers, tend to take an unacceptably long time to charge through a USB port and, as such, are typically provided with an alternative charging port, such as a dedicated charger port.

To reduce charge time, the power available for charging must be increased. Since $P=I*V$, this can be accomplished by increasing the current, increasing the voltage, or both. However, increasing current increases $I^2R$ losses in the cable and connector.

A new standard known as USB Power Delivery (referred to herein as "USBPD") is in early development by USB Implementers Forum, Inc, the creators of USB technology. For example, a document entitled Universal Serial Bus Power Delivery Specification Revision 1.0, including Errata through 31 Oct. 2012 (Version 1.1), incorporated herein by reference, is available for download from the website at usb.org. Since there is not yet compliance documentation, this proposed standard is years away from implementation, if ever.

A potential drawback of the USBPD specification is that it proposes to provide communication between a host and a device over the power line of the USB bus. This method of communication has several disadvantages including the requirement that a large inductor be added to the circuit to counteract the effect of the large AC bypass capacitor required for signal over power, and because a USB power transceiver must be added to both the host (e.g. power converter) and to the device (e.g. a tablet computer).

Another potential solution for providing higher power to electronic devices is to provide a special, dedicated connector. However, this adds both cost and complexity to the electronic device and its operation.

These and other limitations of the prior art will become apparent to those of skill in the art upon a reading of the following descriptions and a study of the several figures of the drawing.

SUMMARY

In an embodiment, set forth by way of example and not limitation, an apparatus for providing power to an electronic device includes a bus having a power line, a ground line and at least one data communication line, a variable voltage converter, and logic coupled to the at least one data communication line the variable voltage converter and operative to develop an voltage control signal to develop a charging voltage in response to data communication with an electronic device. The apparatus, in a non-limiting example, can further include a host ID for selectively coupling to the at least one data communication line to emulate a legacy mode.

In an embodiment, set forth by way of example and not limitation a USB power converter device for an electronic device includes a USB bus including VBUS power line, a D− data line and a D+ data line, a processor clock, a USB transceiver coupled to the D− data line and the D+ data line, and a processor coupled to processor clock and to the USB transceiver. In an embodiment, a variable voltage converter has a power input, (e.g. an alternating current or "AC" input), a direct current (DC) output coupled to the VBUS power line, and a voltage control input responsive to a voltage control signal developed by the processor to provide a plurality of voltage levels at the DC output. The processor is, in an example embodiment, operative to develop the control signal based upon communication from an electronic device connected to the USB bus. In a non-limiting embodiment, the USB power converter device further includes a host ID controller having a host ID control input coupled to the processor, the host ID controller selectively coupled to the D− data line and the D+ data line in response to a host ID control signal developed by the processor.

In an embodiment, set forth by way of example and not limitation, a method for providing power through a USB port of an electronic device includes connecting a power supply to a USB port of an electronic device, emulating a personal computer (PC) host system such that the electronic device believes that the power supply is a PC host system, retrieving at least one descriptor from the electronic device, identifying the electronic device from the at least one descriptor, and setting a charging voltage based upon the identity of the electronic device. In an embodiment, the USB port includes a VBUS power line, a D− data line and a D+ data line and the descriptor includes one or more of a Vendor Identification Number (VID), a Product Identification Number (PID), and a code in a text descriptor field.

An advantage of certain embodiments is that no modifications have to be made to electronic devices having USB ports. Certain embodiments are also advantageous is that they are backwardly compatible to legacy standards. Still further, it is an advantage of certain embodiments that more power can be provided to electronic devices without exceeding the capacities of existing USB connectors.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
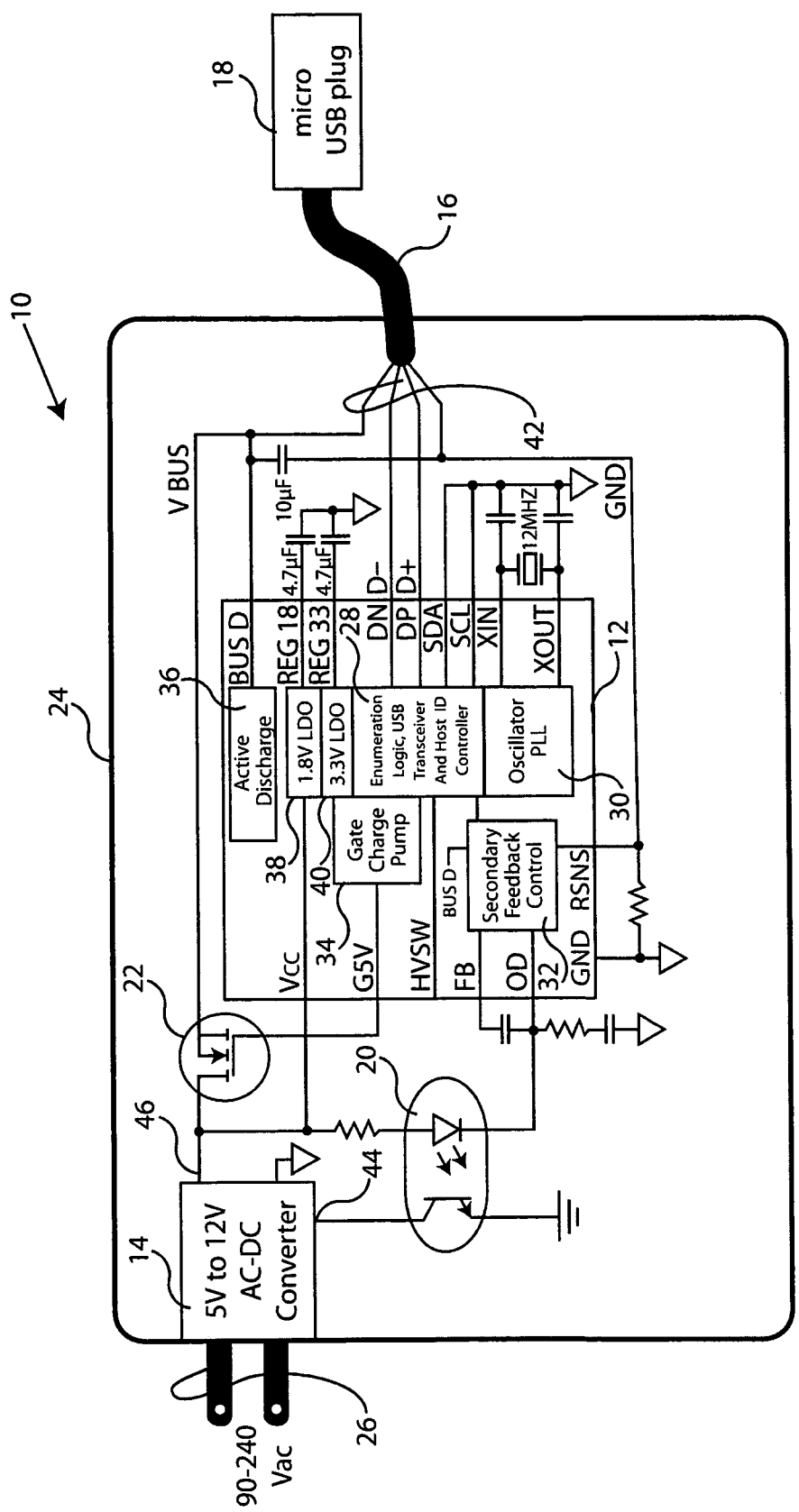
FIG. 1 is a block diagram, set forth by way of example and not limitation, of a USB power converter for an electronic device.

FIG. 1 is a block diagram, set forth by way of example and not limitation, of a USB power converter 10 for an electronic device (not shown). In this example, USB power converter 10 includes a controller 12, a variable voltage converter 14, a USB cable 16, and a USB plug 18. The USB power converter 10, in this embodiment, also included an optical isolator 20 and a MOSFET switch 22. In certain embodiments, controller 12, variable voltage converter 14, optical isolator 20 and MOSFET switch can be enclosed within a case 24 in a configuration known variously as a "wall wart", "AC adapter" or "power adaptor", where prongs 26 (the "power input" to the variable voltage converter 14 in this example) extend from the case 24 to engage an electrical wall socket and cable 16 extends through a wall of the case 24. In other embodiments, other packaging configurations can be used. For example, in embodiments where the variable voltage converter is a DC-to-DC converter (e.g. such as in automotive applications with a 12V DC power input), different packaging and connector arrangements are used. By "variable voltage converter" it is meant that the voltage converter has more than one non-zero output voltage levels, i.e. two or more voltage levels can be provided at the output of the converter.

Controller 12 can, by way of non-limiting example, be made as an integrated circuit (IC) including a semiconductor chip providing the active components of the IC, an insulating package, and a number of conductive leads or "pins" extending through the package and electrically connected to the IC. In this embodiment, controller 12 includes an Enumeration Logic, USB Transceiver and Host ID Controller block 28, an Oscillator PLL block 30, a Secondary Feedback Control block 32, a Gate Charge Pump 34, an Active Discharge 36, a 1.8V LDO 38 and a 3.3V LDO 40, each of which is coupled to at least one pin of the IC. Block 28, in this example, is coupled to pins DN and DP which correspond to the D− and D+ lines, respectively, of a USB bus 42. A VBUS line of USB bus 42 is coupled to an output of the variable voltage converter 14 by MOSFET switch 22. By opening the switch 22, the VBUS is allowed to float, which typically causes an electronic device attached to USB plug 18 to go into a USB reset mode. The fourth line of the USB bus 42, in this example, is ground or GND.

Block 28 uses the data lines D+ and D− to communicate with an attached electronic device (not shown) to determine the maximum voltage level (MAXVOLT) that should be applied to VBUS. Once MAXVOLT has been determined, block 28 causes block 32 to provide a signal to optical isolator 20 to provide a signal at a control input 44 of the variable voltage converter 14. The optical isolator provides galvanic isolation between the controller 12 and the variable voltage converter 14.

In the embodiment of FIG. 1, block 32 includes a digital-to-analog converter (DAC), which takes a digital signal from block 28 and converts it to an analog signal to be applied to optical isolator 20. In this non-limiting example, the output 46 of the variable voltage converter 14 can vary within a range, e.g. from 5V DC to 12V DC. In other embodiments, other ranges can be used. For example, in certain embodiments the range can be from 2-20V DC, and in still other embodiments the range can be from 3.5-16.25V DC. By providing a DAC, a number of voltage levels within a range can be provided at output 46.

Figure 2:
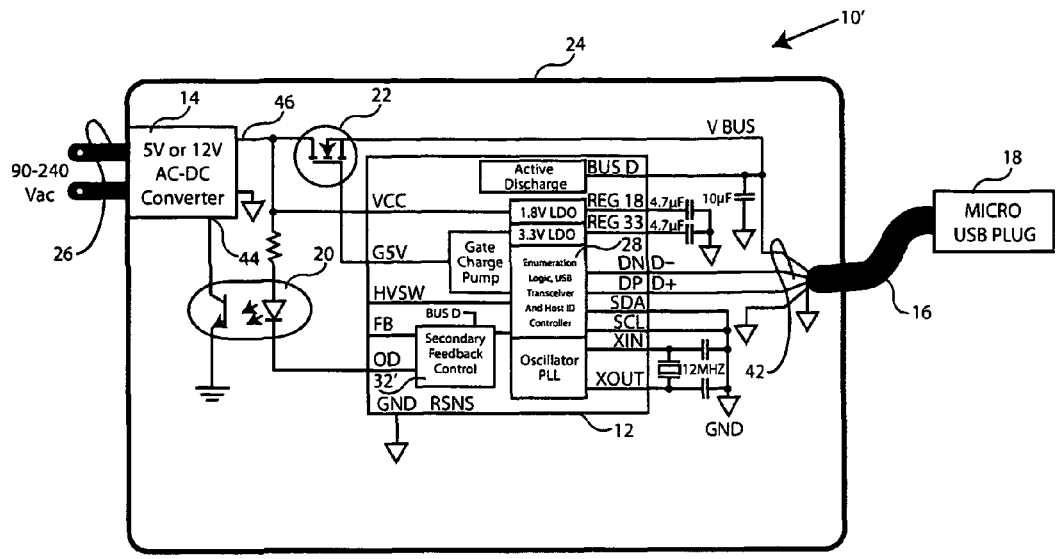
FIG. 2 is a block diagram, set forth by way of example and not limitation, of an alternate embodiment of a USB power converter for an electronic device.

FIG. 2 is a block diagram, set forth by way of example and not limitation, of a USB power converter 10' for an electronic device (not shown) which is similar to the USB power converter 10 of FIG. 1, where like reference numbers refer to like components. USB power converter 10' differs from USB power converter 10 by its control of the variable voltage converter 14. In this example embodiment, the optical oscillator 20 is controlled in an on/off manner by block 28 such that the variable voltage converter 14 could be caused to toggle between two output voltages. For example, the output 46 can be either 2 or 20 volts, or either 3.5 or 16.25 volts, or either 5 or 12 volts, by way of non-limiting examples. In this embodiment, no DAC is required for block 32'.

Figure 3:
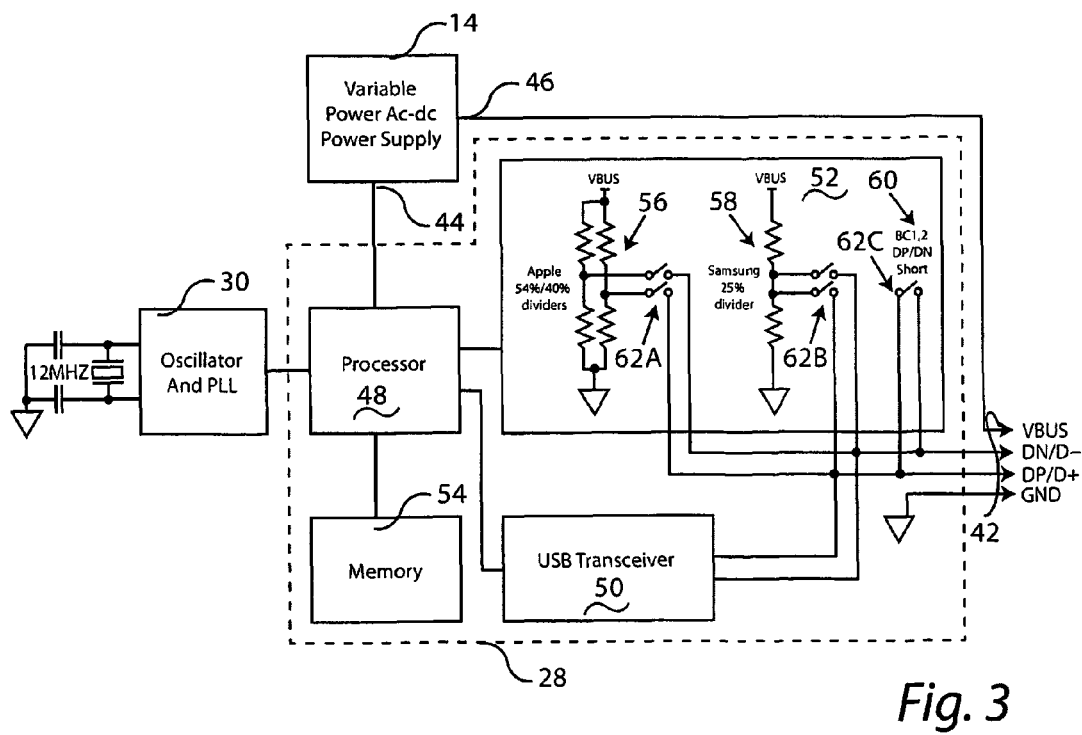
FIG. 3 is a block diagram, set forth by way of example and not limitation, illustrating the Enumeration Logic, USB transceiver and Host ID Controller block 28 of FIGS. 1 and 2 in greater detail.

FIG. 3 is a block diagram, set forth by way of example and not limitation, illustrating the block 28 of FIGS. 1 and 2 in greater detail. In this example, block 28 includes a processor 48, a USB transceiver 50, a host ID controller 52 and digital memory 54. Processor 48 can be implemented in a number of technologies, as will be appreciated by those of skill in the art, including microprocessors, microcontrollers, state machines, discrete logic, etc. In a preferred embodiment, processor 48 is a microcontroller capable of executing instructions an processing data stored, by way of non-limiting example, in memory 54. USB transceiver 50 is coupled to processor 48 and is also coupled to data pins DN and DP which are, in this example, connected to USB bus 42 data lines D− and D+, respectively. Processor 48 is, in this example, capable of communicating with an electronic device (not show) on the data lines D+, D− using standard USB communication protocols.

Host ID Controller 52 is coupled to processor 48 and provides backward compatibility to electronic devices that cannot accept higher voltage levels on the VBUS line of a USB bus. In this non-limiting example, three legacy host ID standards are supported: the Apple, Inc. host ID standard 56, the Samsung host ID standard 58 and the USB host ID standard 60. Each of these host ID standards is coupled to the DN & DP pins by switches 62A, 62B and 62C which are controlled by processor 48.

When a device is attached to a USB host (or a device such as U.S.B power converter 10/10' which emulates a USB host), an "enumeration engine" will begin normal USB traffic similar to data that would be output from a personal computer (PC). During enumeration data traffic, the U.S.B power converter 10/10' asks the device for a number of parameters called "descriptors" which are required to have certain elements including a USB-IF assigned VID (Vendor Identification Number) and a device-manufacturer assigned PID (Product Identification Number). USB-IF recommends that the PID to be unique among all devices produced by the device manufacturer. There is also an additional (and optional) descriptor containing a simple text field, which some host devices (typically PCs) use as information only for display to the user. Collectively, identifiers such as VIDs, PIDs, and strings are referred to herein generically as "descriptors." An electronic device attached to U.S.B power converter 10/10' can be positively identified using some or all of these descriptors.

Optionally, the text descriptor can be used to convey other information, such as the voltage that it would prefer or a range of voltages that it can accept. The limit of conveyed information is only limited to the number of bits allowed in the text field and the encoding the code segments.

While the communication flow during enumeration is limited in that a "host" can only send well defined descriptor request to the attached device (no general data passing is allowed), in a non-limiting embodiment additional information exchanges can occur based on manipulation of the request sent from the host to the attached device that differ from USB norms but which are still are USB spec compliant. For example, the order of descriptor requests can be changed of the number of times a particular descriptor can be manipulated to convey additional information in certain non-limiting embodiments.

Figure 4:
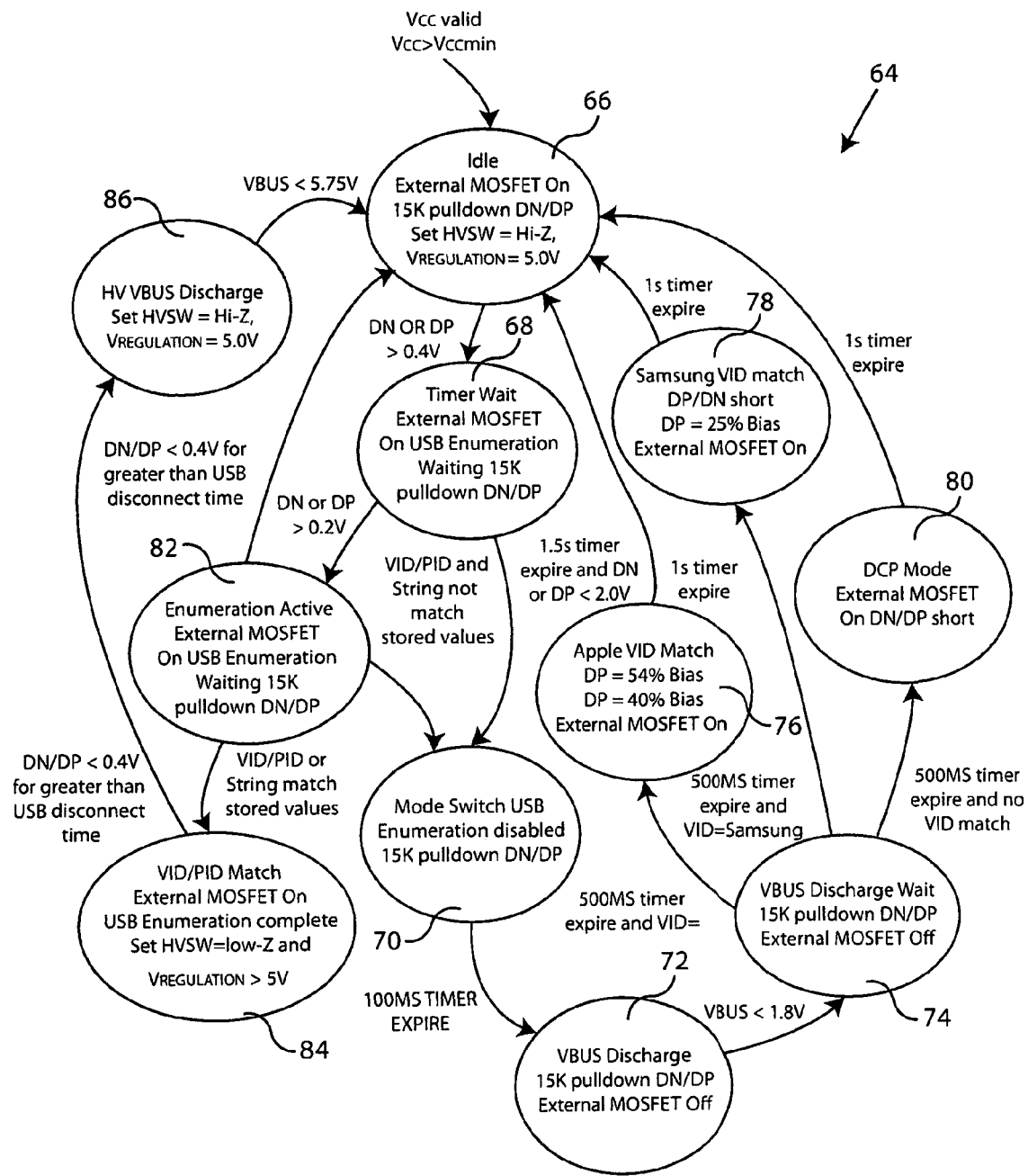
FIG. 4 is a state diagram, set forth by way of example and not limitation, of a process implemented by the Enumeration Logic.

FIG. 4 is a state diagram 64, set forth by way of example and not limitation, of a process implemented by, for example, processor 48 and code segments stored, for example, in memory 54. The process utilizes communication between the processor 48 and an electronic device (not shown) via the D+ and D− lines of a USB bus. In a non-limiting example, the processor 48 retrieves a vendor identification number (VID), a product identification number (PID), or a special string indicating a maximum voltage level for the VBUS from the electronic device. For example, a company will have a unique VID and a range of PIDs for its various products. Vendor-configurable USB strings can be used to encode maximum VBUS voltage levels.

In the example of FIG. 4, an idle state 66 the USB bus is not connected to an electronic device and the voltage level on VBUS is set to a default value, e.g. 5 volts. A state 68 is entered if a voltage level of, for example, 0.4 volts or greater is detected on DN (D−) or DP (D+), indicating that an electronic device has been connected to the USB bus. If after a timeout period (e.g. 1.5 seconds) DN or DP is less than a certain voltage level (e.g. 2V) a Mode Switch state 70 is entered wherein the USB enumeration is disabled. After the expiration of a time (e.g. 100 ms), a VBUS discharge state 72 is entered. When VBUS drops below a certain voltage level (e.g. 1.8 V) a VBUS discharge wait mode 74 is entered. After a period of time (e.g. 500 ms), the state branches to one of three legacy states, the Apple VID match state 76, the Samsung VID match state 78, or the DCP mode state 80. After the expiration of a timer (e.g. 1 second), the process returns to the idle state 66.

If, when in Timer Wait state 68, the DN or DP pins are greater than a give level (e.g. 2 V) an Enumeration active 82 mode is entered. If there is no match with a VID/PID or string, mode 70 is entered. However, if there is a VID/PID or string match, a VID/PID Match state 84 is entered. If DN/DP drop to below a given level (e.g. 0.4V) for greater than USB disconnect time, an HV VBUS discharge state 86 is entered where the VBUS is at an elevated state. After VBUS drops below a threshold (e.g. 5.75 V), the idle mode 66 is reentered.

Figure 5:
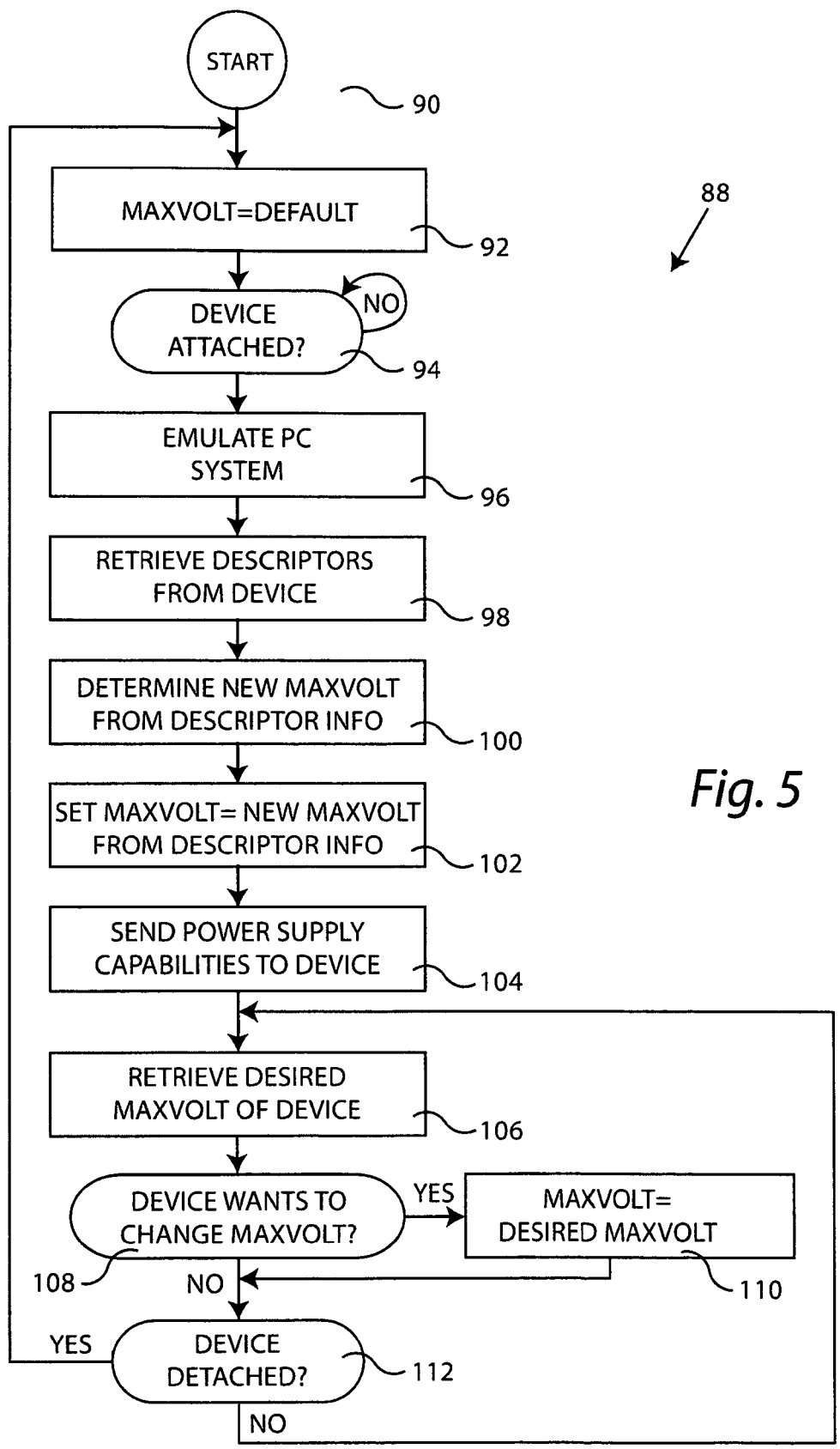
FIG. 5 is a flow diagram, set forth by way of example and not limitation, of a process that may be implemented by the USB power converters of FIGS. 1 and 2.

FIG. 5 is a flow diagram, set forth by way of example and not limitation, of a process 88 that may be implemented by the USB power converters of FIGS. 1 and 2. Process 88 begins at 90 and, in an operation 92, a variable MAXVOLT is set to a default value. For example, MAXVOLT can be set to 5 volts DC (a USB standard voltage). Next, in an operation 94, it is determined if the USB connector 18 has been engaged with an active electronic device (not shown). If not, operation 94 idles. If, however, and electronic device is attached, an operation 96 causes the U.S.B power converter 10/10' to emulate a PC system. This can be accomplished by applying certain protocols to the data lines D+, D−, as will be appreciated by those of skill in the art. Next, in an operation 98, descriptors are retrieved from the electronic device. For example, VID, PID or USB strings are retrieved from the electronic device.

In an operation 100, a new MAXVOLT level is determined from the retrieved descriptors. For example, a lookup table store in, for example, memory 54 can use the VID and/or PID to determine the maximum voltage that can be applied to the VBUS for that particular electronic device. Also, the vendor-configurable USB string can directly encode the new MAXVOLT level. Then, in an operation 102, the variable MAXVOLT is assigned the new maximum voltage level derived by the operation 100.

Next, in an operation 104, the U.S.B power converter 10/10' sends the electronic device information about its capabilities. For example, USB power converter 10 could indicate to the electronic device that it can provide VBUS voltage levels anywhere in the range of 2-20 volts. For another example, USB power converter 10' could indicate to the electronic device that it can provide VBUS voltage levels at either 3.5 or 16.25 V DC. This communication takes place over the D+/D− data lines of the USB bus 42.

Next, in an operation 106, a desired maximum voltage level for VBUS is sent by the electronic device in response to the information that it received in operation 104. The desired maximum voltage level may be different from the maximum voltage level that was derived from the descriptor information in operation 100, and can potentially change with environmental or operating conditions for the electronic device. If the electronic device wants to adopt a new maximum voltage level for VBUS as determined by an operation 108 then an operation 110 sets the variable MAXVOLT to the desired new maximum voltage level. A decision operation 112 then determines if the electronic device is still attached to the USB bus. If so, operational control returns to operation 106. If not, operational control returns to operation 90.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An apparatus for providing power to an electronic device comprising:
   a bus having a power line, a ground line and at least one data communication line;
   a variable voltage converter having a power input and a direct current (DC) output selectively coupled to the power line of the bus by a switch, the variable voltage converter having a voltage control signal input, whereby the variable voltage converter can provide a plurality of voltage levels at the DC output;
   logic coupled to the at least one data communication line and having a voltage control signal output developed in response to data communication with an electronic device and a switch control signal output coupled to the switch;
   a host ID controller having a host ID control input coupled to the logic, the host ID controller selectively coupled to the at least one data communication line in response to a host ID control signal developed by the logic; and
   a galvanic isolator coupling the voltage control signal output of the logic to the voltage control signal input of the variable voltage converter.

2. An apparatus for providing power to an electronic device as recited in claim 1 further comprising memory coupled to the logic including information relating to a plurality of electronic devices.

3. An apparatus for providing power to an electronic device as recited in claim 2 further comprising a transceiver coupling the logic to the at least one data communication line.

4. An apparatus for providing power to an electronic device as recited in claim 3 wherein the logic comprises a digital processor operated by stored code segments.

5. An apparatus for providing power to an electronic device as recited in claim 1 wherein the galvanic isolator is an optical isolator.

6. An apparatus for providing power to an electronic device as recited in claim 5 wherein the switch comprises a transistor.

7. An apparatus for providing power to an electronic device as recited in claim 6 wherein the transistor is a MOSFET.

8. A USB power converter device for an electronic device comprising:
- a USB bus including VBUS power line, a D− data line and a D+ data line;
- a USB transceiver coupled to the D− data line and the D+ data line;
- memory comprising code segments including instructions and data, wherein the data includes information relating to a plurality of electronic devices, and wherein the instructions comprise:
  - (a) code segments to emulate a personal computer (PC) host system;
  - (b) code segments to retrieve at least one descriptor from an electronic device of the plurality of electronic devices;
  - (c) code segments to identify a maximum voltage level to be provided to the electronic device from the at least one descriptor;
  - (d) code segments to control a switch to selectively couple a DC output of a variable voltage converter to the power line; and
  - (e) code segments to develop a voltage control signal to set the DC output of the variable voltage converter to the maximum voltage level via a galvanic isolator;
- a digital processor coupled to the memory and to the USB transceiver, the processor being operative to develop a host ID control signal output based upon communication over at least one of the D− data line and the D+ data line with an electronic device connected to the USB bus that is one of the plurality of electronic devices; and
- a host ID controller having a host ID control signal input coupled to the host ID control signal output of the processor, the host ID controller selectively coupled to the D− data line and the D+ data line in response to a host ID control signal corresponding to the electronic device.

9. A USB power converter device for an electronic device as recited in claim 8 further comprising:
- a variable voltage converter having a power input and a direct current (DC) output coupled to the VBUS power line, the variable voltage converter having a voltage control input responsive to a voltage control signal developed by the digital processor to provide a plurality of voltage levels at the DC output.

10. An apparatus for providing power to an electronic device comprising:
- a bus having a power line, a ground line and at least one data communication line;
- a variable voltage converter having a power input and a direct current (DC) output selectively coupled to the power line of the bus by a switch, the variable voltage converter having a voltage control signal input, whereby the variable voltage converter can provide a plurality of voltage levels at the DC output;
- logic coupled to the switch and to the at least one data communication line and having a voltage control signal output developed in response to data communication with an electronic device by:
  - (a) emulating a personal computer (PC) host system;
  - (b) retrieving at least one descriptor from the electronic device;
  - (c) identifying a maximum voltage level to be provided to the electronic device from the at least one descriptor; and
  - (d) developing the voltage control signal to set the DC output to the maximum voltage level; and
- a galvanic isolator coupling the voltage control signal output of the logic to the voltage control signal input of the variable voltage converter.

11. An apparatus for providing power to an electronic device as recited in claim 10 wherein the logic is further operative to set the DC output to a default value if the electronic device is not detected.

12. An apparatus for providing power to an electronic device as recited in claim 10 wherein the maximum voltage level is a legacy voltage level.

13. An apparatus for providing power to an electronic device as recited in claim 10 wherein the descriptor includes one or more of a Vendor Identification Number (VID), a Product Identification Number (PID), and a code in a text descriptor field.

14. An apparatus for providing power to an electronic device as recited in claim 10 wherein the galvanic isolator is an optical isolator.

15. An apparatus for providing power to an electronic device as recited in claim 14 wherein the switch comprises a transistor.

16. An apparatus for providing power to an electronic device as recited in claim 15 wherein the transistor is a MOSFET.

* * * * *